(12) United States Patent
Allen et al.

(10) Patent No.: US 9,315,318 B2
(45) Date of Patent: Apr. 19, 2016

(54) METHOD OF ASSEMBLING AND DISASSEMBLING A STORAGE TANK

(71) Applicant: Vicwest Inc., Oakville (CA)

(72) Inventors: Bruce Allen, Selkirk (CA); Yuqin Shan, Winnipeg (CA); Brad Warner, Winnipeg (CA); James Andrew Mills, Edmonton (CA)

(73) Assignee: Westeel Canada Inc., Calgary, AB (CA)

(*) Notice: Subject to any disclaimer, the term of this patent is extended or adjusted under 35 U.S.C. 154(b) by 205 days.

(21) Appl. No.: 13/895,968

(22) Filed: May 16, 2013

(65) Prior Publication Data

US 2013/0326853 A1 Dec. 12, 2013

Related U.S. Application Data

(60) Provisional application No. 61/648,765, filed on May 18, 2012.

(51) Int. Cl.
| | |
|---|---|
| *B65D 90/02* | (2006.01) |
| *B65D 90/04* | (2006.01) |
| *E04H 7/06* | (2006.01) |
| *E04H 7/00* | (2006.01) |
| *B23P 11/00* | (2006.01) |

(52) U.S. Cl.
CPC ............ *B65D 90/023* (2013.01); *B65D 90/024* (2013.01); *B65D 90/026* (2013.01); *B65D 90/046* (2013.01); *B65D 90/047* (2013.01); *E04H 7/06* (2013.01); *B23P 11/00* (2013.01); *E04H 7/00* (2013.01); *Y10T 29/49815* (2015.01)

(58) Field of Classification Search
CPC ...... B65D 90/023; B65D 90/02; B65D 90/08; B65D 88/52; E04H 7/06; Y10T 29/49815
See application file for complete search history.

(56) References Cited

U.S. PATENT DOCUMENTS

| | | | | |
|---|---|---|---|---|
| 4,057,295 A | * | 11/1977 | Liet al. ........................ | 406/52 |
| 2011/0194893 A1 | * | 8/2011 | Wiebe ........................... | 403/300 |
| 2013/0098906 A1 | * | 4/2013 | Lovelace et al. ............. | 220/4.12 |

OTHER PUBLICATIONS

Zero Ground Disturbance C-ring Secondary Conainment System Installation & Assembly Manual, Westeel, Manual No. 198799 Rev 2, Oct. 2013.*

* cited by examiner

*Primary Examiner* — Moshe Wilensky
(74) *Attorney, Agent, or Firm* — Ade & Company Inc.; Adrian D. Battison

(57) ABSTRACT

A liquid containment wall for a tank is formed by corrugated panels connected end to end and supported by upstanding brackets at spaced positions around the peripheral wall and a liner attached to the wall. Each panel has at each end an overlapping section with an array of aligned holes. The holes are connected by connector plates shaped and arranged to overlie a part of the array. Each plate has a plurality of shear pegs extending at right angles and at least one hole therethrough to receive a threaded bolt so that the bolt passes through a respective one of the aligned holes of the array to clamp the plate against the overlapping panels.

22 Claims, 4 Drawing Sheets

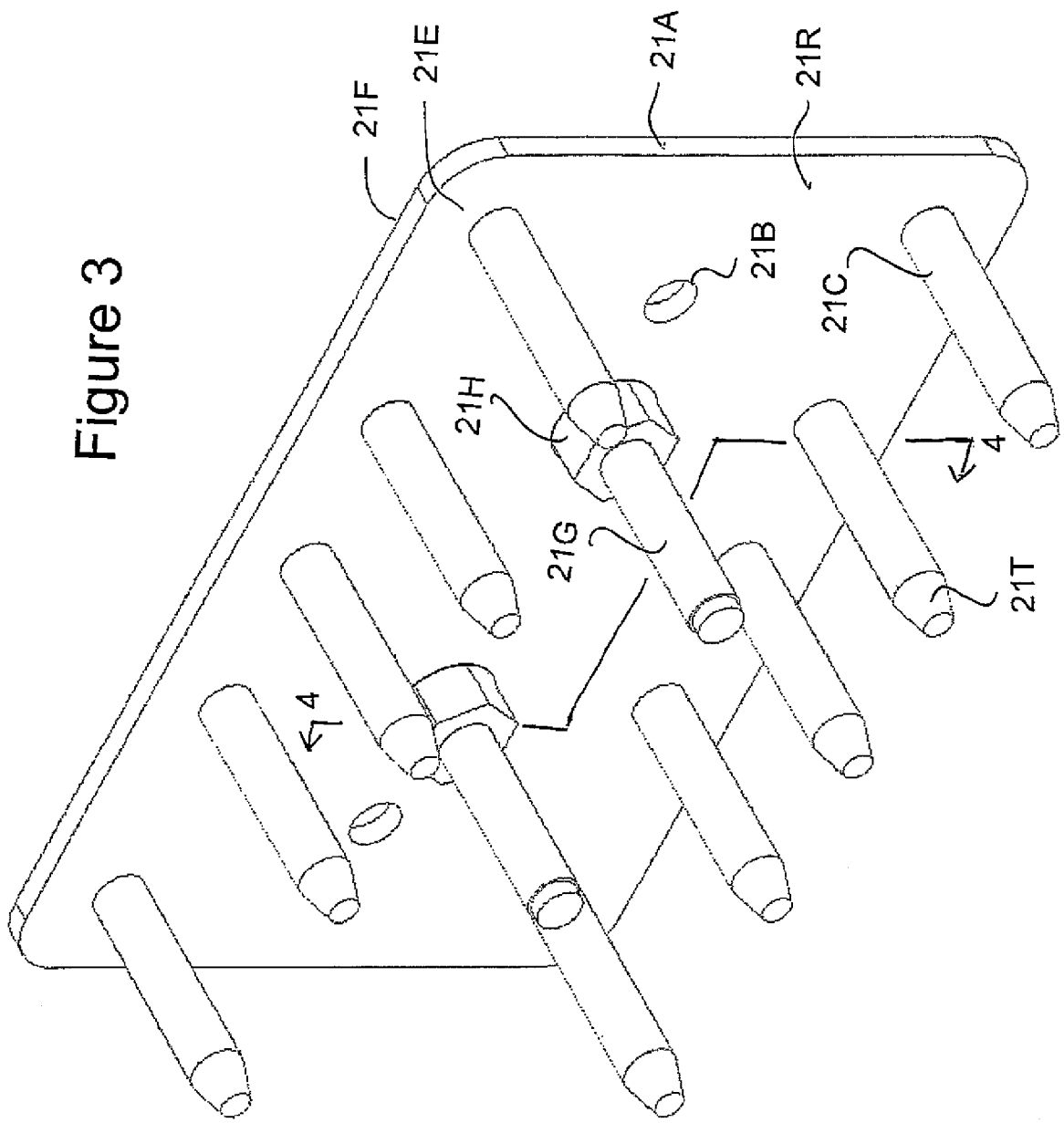

METHOD OF ASSEMBLING AND DISASSEMBLING A STORAGE TANK

This application claims the benefit under 35 USC 119 (e) of Provisional Application 61/648,765 filed May 18, 2012.

This invention relates to a storage tank which is designed particularly for temporary storage so that it can be erected quickly and easily, disassembled and moved to a new location for re-erection. Such tanks are commonly required for a high volume temporary supply of water for fractionation of underground rock in a process known colloquially as "fracking" with the water being contained in "frac-tanks". However tanks for other purposes can also use this system.

BACKGROUND OF THE INVENTION

In order to make frac tanks completely portable, often they are mounted on trailers and many designs of this type are available. However these only contain very limited mounts so that a large number of such trailers would be necessary in many instances.

Other tanks having a capacity between 2000 and 20,000 cubic meters are fabricated on site from panels, typically of metal sheet, with a covering liner. However as the requirement for the water is only temporary, it is necessary for the construction to be of a type which can be readily erected and quickly dismantled and removed to a new location.

Designs have previously been provided of this type for example that sold under the trade mark "C-Ring" containment system by Westeel of Winnipeg Manitoba Canada. This arrangement provides a design formed by corrugated steel panels connected at overlapping ends to form a circular container. This may have a height defined by a single row so that the container is of very large diameter or may be formed by a series of rings of panels stacked one on top of the next to form a height which can be as much as 36 feet. The selection of design can depend on the location and terrain available for the tank. The arrangement of Westeel provides hardware for maintaining stability of the construction when full and when empty as well as liner mounting systems and these components are well known to the person skilled in this art and are not the subject of this invention.

Up to now the panels are merely bolted together at the overlapping ends using techniques used for decades in the grain bin industry.

However the requirement for rapid deployment of the temporary tank requires attention to an alternative for the high labor bolting system.

SUMMARY OF THE INVENTION

It is one object of the invention to provide a set of parts to be used in assembling a portable containment system.

According to one aspect of the invention there is provided set of parts for use in assembly and disassembly of a liquid containment wall of a tank comprising:

a plurality of panels, each having a top edge, a bottom edge, an inner surface, an outer surface, a first end and a second end such that the panels can be arranged with the first end of one connected to the second end of a second to form a peripheral ring of panels surrounding an area to contain a liquid;

each panel having at each end an end section for connection to a next adjacent panel, each end section containing an array of holes;

a plurality of connector plates;

each plate being shaped and arranged to overlie a part only of the array of holes so that a plurality of the plates are arranged on the array of holes each cooperating with a respective part of the array of holes;

the plates being shaped and arranged for attachment to the end section of one plate so as to couple the end section of said one plate to an end section of a next adjacent plate;

each plate having a plurality of shear pegs attached to the plate so as to extend at right angles thereto, the shear pegs being arranged in an array so that the shear pegs are aligned with selected ones of the holes of the array;

the panels and plates being arranged for connecting each end portion of the panels to an end portion of a next adjacent panel by inserting the shear pegs of each plate through the holes of the array;

the panels and plates being arranged for fastening each plate to the end portion of a panel by at least one male threaded fastener, separate from the shear pegs, which extends through the plate and through the panel and is held in place by a cooperating female threaded fastener to clamp the plate against the end portion;

so that the shear pegs are held in place extending through the respective hole by the threaded fastener;

the panels and plates being arranged for disassembling the panels by releasing said at least one male threaded fastener from its cooperating female threaded fastener to release the plate from being clamped against the end portion;

the panels and plates being arranged so that, with said the plate being released from being clamped against the end portion, the shear pegs are free to be pulled from the respective holes to release the plate from the end portion.

According to a second definition of this invention there is provided a method for assembly and disassembly of a liquid containment wall of a tank comprising:

providing a plurality of panels, each having a top edge, a bottom edge, an inner surface, an outer surface, a first end and a second end such that the panels can be arranged with the first end of one connected to the second end of a second to form a peripheral ring of panels surrounding an area to contain a liquid;

providing on each panel at each end an end section for connection to a next adjacent panel, each end section containing an array of holes;

providing a plurality of connector plates;

each plate being shaped and arranged to overlie a part only of the array of holes so that a plurality of the plates are arranged on the array of holes each cooperating with a respective part of the array of holes;

attaching the plates to the end section of one plate so as to couple the end section of said one plate to an end section of a next adjacent plate;

each plate having a plurality of shear pegs attached to the plate so as to extend at right angles thereto, the shear pegs being arranged in an array so that the shear pegs are aligned with selected ones of the holes of the array;

assembling the panels by connecting each end portion of the panels to an end portion of a next adjacent panel by inserting the shear pegs of each plate through the holes of the array;

assembling the panels by fastening each plate to the end portion of a panel by at least one male threaded fastener, separate from the shear pegs, which extends through the plate and through the panel and is held in place by a cooperating female threaded fastener to clamp the plate against the end portion;

so that the shear pegs are held in place extending through the respective hole by the threaded fastener;

disassembling the panels by releasing said at least one male threaded fastener from its cooperating female threaded fastener to release the plate from being clamped against the end portion;

so that, with said the plate being released from being clamped against the end portion, the shear pegs are free to be pulled from the respective holes to release the plate from the end portion.

Preferably the end section of one panel is overlapped with that of the next adjacent panel so that the holes of the array align with those of the next panel to form an array of aligned holes into which the shear pegs are inserted to prevent movement of the panels in the plane of the panels. However the plates can also be used in a butt joint arrangement where some of the pegs engage with one panel and others of the pegs engage with a second panel and shearing forces tending to move the panels are apart are accommodated through the body of the plate.

Preferably each plate includes at least one hole for receiving said at least one male threaded fastener inserted therethrough. That is the fasteners are separate from the plate and can be inserted through the holes in the plate. However the fasteners may be permanently attached to the plate.

Preferably each male threaded fastener is arranged, for example by washers or the like, so as to be held in place in the hole so as to be carried by the plate when the plate is removed.

Preferably the shear pegs are permanently attached to the plate.

For example the shear pegs can be attached to the plate by shoulder members formed on the peg by a method such as hot up-setting in front of and behind the plate to clamp the plate therebetween. This can provide a better mounting of the peg on the plate than simple welding to ensure that the pegs remain attached of the plate under the significant loading which can occur on the joints in the plates caused by the weight of water in a large tank.

Preferably the shear pegs are free from any fastening element such as a nut or the like so that they are free to be inserted through and removed from the holes in the plate without any action required to release a fastener from the pegs.

Preferably each shear peg comprises a cylindrical pin with a smooth exterior for sliding passage through the array of holes and with a tapered or pointed outer end to assist in manually pressing the plate and pegs onto the panel, bearing in mind that erection of large numbers of large panels may lead to slight mis-alignments.

Preferably each plate includes at least two holes each for receiving a bolt. The number of holes is selected to ensure that the plate is held clamped to the sections of the panels to hold the panels together in contact to so that the shear pegs remain properly engaged through the holes. Thus the shear load, caused by the weight of the liquid contained tending to pull the connection of the panels longitudinally of the panels, is taken primarily by the shear pegs. In many cases four holes are provided at spaced positions adjacent the corners of the plate to hold all of the plate into the contact position.

Preferably each plate includes at least four shear pegs and in many cases there may be as many as 10 or more shear pegs. The shear pegs are formed of for example a hardened steel so as to accommodate the high shear loads.

Preferably the hole or holes are arranged in a row with a plurality of the shear pegs for cooperation with a row of aligned holes of the array. However the holes may not be in a row with the shear pegs provided they properly cooperate with the panel to provide the shear resistance of the pegs and the clamping action of the bolts.

Typically the row of shear pegs and the hole or holes are arranged at equidistant spacing since this ensures simple assembly at an array of equidistantly spaced holes in the panel. However other arrays of holes and pegs can be provided.

In one preferred example, each plate includes at least two rows of the shear pegs for cooperation with a respective row of aligned holes of the array in the panels with each row of shear pegs also containing at least one hole and preferably two holes for bolt.

Preferably the panels are corrugated to form ridges and valley between the ridges with the ridges and valleys of the two overlapping panels aligned. Such corrugated panels are widely used for walls of this nature in view of the increased strength. However the same connection system using the plates can also be used with walls which are formed of flat panels Where corrugated panels are used, the plate lies in contact with at least two of the ridges of an adjacent one of the panels and the aligned holes in the panels are located in rows in the ridges of the adjacent one of the panels. Typically in this arrangement, the plates have two rows of shear pegs for cooperation with aligned holes in two adjacent ridges of the panel leaving a space between the valley between the ridges and the plate.

The space can be used to pry off the plate for removal of the plate, either using a simply pry bar or the plate can include at least one nut welded to the plate at the space. The nut is used by a bolt which is passed though the nut to apply pressure to the panel at the valley to pry off the plate.

The set of parts can also include plates which have three rows of shear pegs for cooperation with aligned holes in three adjacent ridges of the panel. The plates can thus include wider plates of three rows and narrower plates of two rows for use in selected arrangements depending on the height of the panels and the required force to resist the shear loads Preferably the bolt is separate from the hole so as to be passed through the hole with the shear pegs already in place in the aligned holes of the panels. A nut is then applied and torque applied to hold the plate in place. However the bolts may be pre-inserted through holes or form part of the plate.

Preferably the shear pegs have a smooth exterior for sliding passage through the aligned holes. That is it is not intended that the pegs be threaded and do not cooperate with a nut so that they only act in shear and do not provide any clamping action. In this way the pegs can be easily formed from harder material more resistant to shear.

In order to allow the pegs to be inserted when the holes are slightly misaligned or when repeated use has provided some distortions, the shear pegs are preferably tapered at the ends for insertion into the aligned holes.

Preferably the plates are mounted on the inner surface of the panels with the shear pegs facing outwardly.

Where the tank is of a higher construction in which the panels are arranged for connection with one peripheral ring of panels mounted on a lower ring of panels to form a stacked wall of panels preferably the overlapped sections of said one ring are staggered relative to those of the lower ring.

The wall sheets are initially assembled together using only the holes located along the top and bottom horizontal seams of a multi-row assembly. This also aligns all of the other holes at the vertical mating seams of the overlapping sections. One crew can continue to assemble the wall sheets in this manner.

A second crew can insert the connector plates from the inside with the studs projecting outwards. They would be started into the holes and insert relatively easily. The ends of the studs can be tapered to facilitate the start of alignment and then they are hammered in, or drawn in with bolts at the four hole locations. The four bolts hold in place during the life of the installation and insure all of the shear studs are properly in shear position.

When tearing down the site and removing the connector plates, bolts can be inserted into the cinch nuts and the plates jacked out by turning the bolts in. The cinch nuts are on the inside in the valley of the corrugation so they are pushing against the plate in their strongest orientation. The cinch nuts are not essential and the plates can in some cases simply be removed by a pry bar inserted into the gap. All components are then reused at the next site.

BRIEF DESCRIPTION OF THE DRAWINGS

One embodiment of the invention will now be described in conjunction with the accompanying drawings in which:

FIG. 3 is an isometric view of one plate for connection of the overlapping sections of the panels.

In the drawings like characters of reference indicate corresponding parts in the different figures.

DETAILED DESCRIPTION

Figure 1:
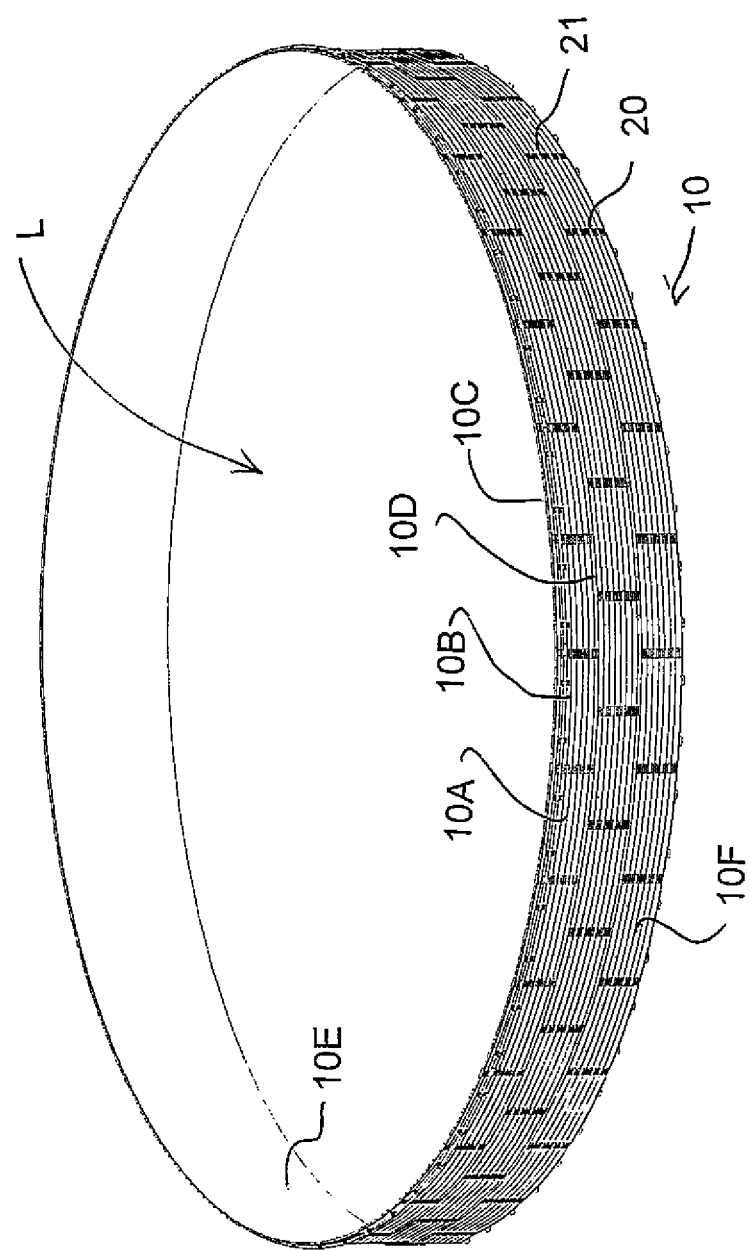
FIG. 1 is an isometric view of a tank according to the present invention showing the outside of the peripheral wall.
Figure 2:
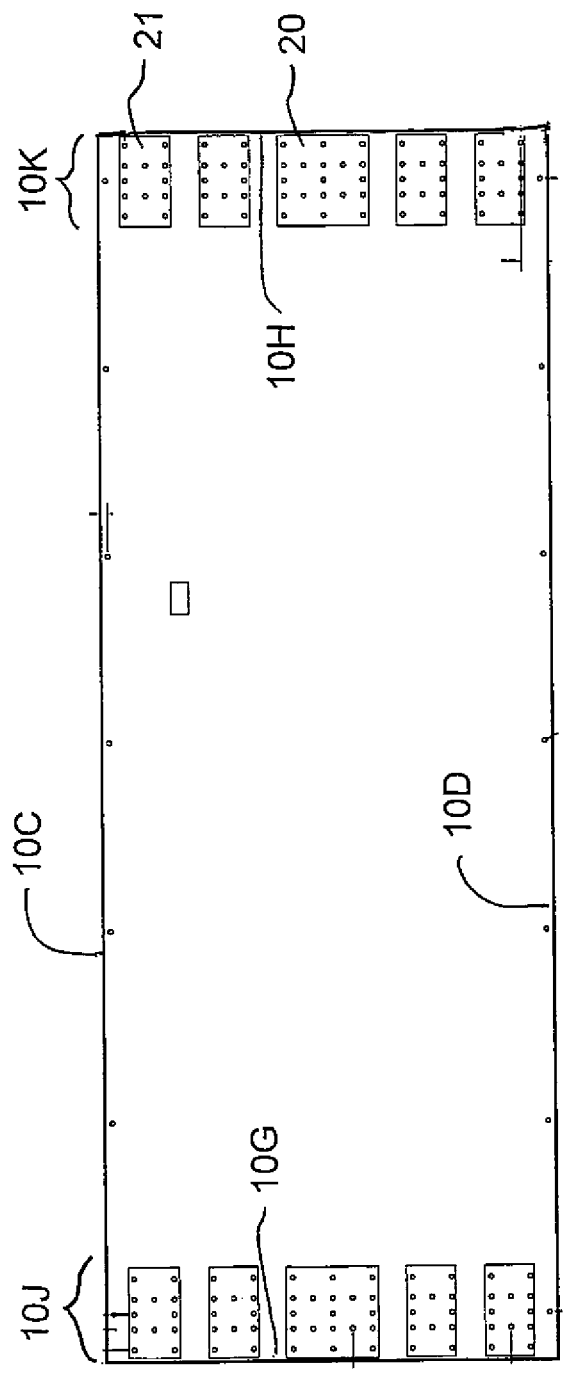
FIG. 2 is an elevational view of the containment barrier of FIG. 1 showing the inside of the peripheral wall with the mounting plates in position.
Figure 4:
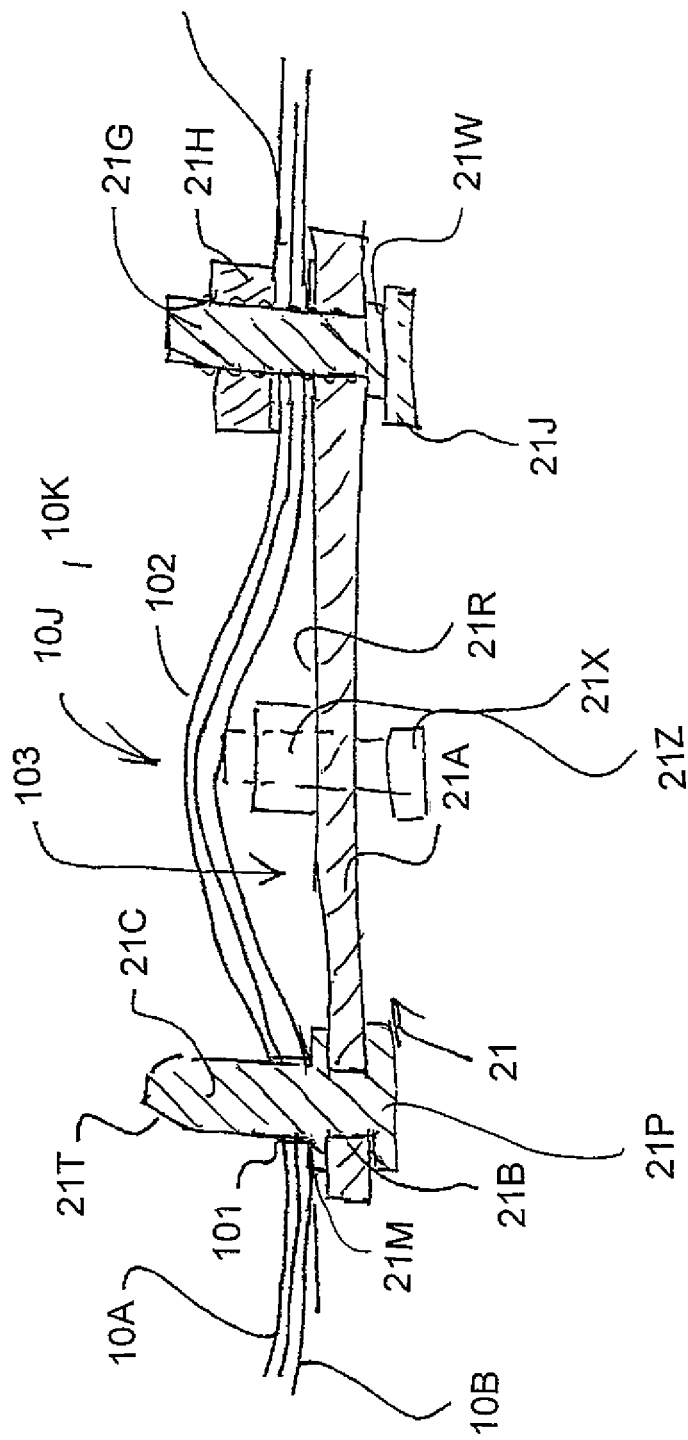
FIG. 4 is a cross-sectional view along the lines 4-4 of FIG. 3.

The arrangement shown in the drawings comprises a set of parts for assembly into a tank which in the figures are shown in the assembled position.

A peripheral wall 10 is formed by a plurality of panels 10A, 10B etc, each having a top edge 10C, a bottom edge 10D, an inner surface WE and an outer surface 10F.

Each panel has a first end 10G and a second end 10H such that the panels can be arranged with the first end of one connected to the second end of a second at an overlapping section 10J, 10K to form the complete peripheral wall surrounding an area to be confined.

The panels are formed from the same material used in grain bins so as to be horizontally corrugated for strength to form horizontal ribs 101 and valleys 102. The panels are of the same height so that the top edges 10C of a bottom or single row of the panels are arranged at a common height to define a common top edge of the peripheral wall with the bottom edge 10D resting on the ground.

Each panel has at each end the sections 10J and 10K for overlapping connection to a next adjacent panel. Each section contains an array of holes arranged in rows 10L along the ribs 101 so as to form a plurality of rows of holes at each end. In this way, when the section of one panel is overlapped with that of the next adjacent panel using the horizontal mounting holes at the top and bottom for initial assembly, the holes of the rows 10L align to form an array of aligned holes in the overlapping sections 10J, 10K. The tank further includes a liner L arranged over the ground incise the wall and over the wall to which it is fastened by a suitable fastening system.

The system further includes a plurality of connector plates 20 and 21. Each plate 21 is shaped and arranged to overlie a part of the array so that five of the plates are arranged at the overlapping sections 10J, 10K each cooperating with a respective part of the array. In the example shown there are four of the plates 21 and a center one of the plates 20 which cooperate to engage the holes 10L in each of the ribs 101.

The plates have a flat plate structure 21A with a plurality of holes 21B arranged in an array matching the array of holes 10L. Some of the holes 21B of the plate have respective ones of ten shear pegs 21C extending at right angles to the plate 21A and arranged in the array defined by the holes 21B so that the pegs pass through selected ones of the aligned holes 10L of the array on the panels. Each of the pegs has a tapered leading end 21T.

Two of the holes 21B as indicated at 21D and 21E in each row 21F are left open to receive a threaded bolt 21G extending at right angles thereto with a head 21J on the outer side of the plate and a nut 21H on the inner face of the plate so that the bolt passes through a respective one of the aligned holes of the array to clamp the plate against the overlapping panels 10A, 10B at the overlapping portions 10J, 10K.

The holes 21B can be of a square or other non-circular cross-section so as to hold the bolts against rotation while a nut is applied from the outside. In this way an installer can in a first step insert all the bolts from a first side using a washer 21W to hold them in place and then from the other side all of the nuts can be applied and tightened without access to the first side.

The plates 21 include at least two rows of the shear pegs for cooperation with a row of aligned holes of the array with each row containing at least one hole for the bolt 21G. The bolt 21G is separate from the hole so as to be simply loosely passed through the hole with the shear pegs already in place in the aligned holes of the panels. The shear pegs 21C have a smooth cylindrical exterior for sliding passage through the aligned holes and the shear pegs are free from any fastening element so that they are free to be inserted through and removed from the holes in the plate by a simple sliding action.

The outer face 21R of the plate 21A lies in contact with at least two of the ridges 101 of an adjacent one of the panels and the aligned holes 10L in the panels are located in rows in the ridges 101 of the adjacent one of the panels to clamp each ridge or rib to the plate. This leaves a space 103 between the valley 102 and the surface 21R of the plate which is used to pry off the plate for removal of the plate.

As shown the plate 23A includes at least one optional cinch nut 21X at the space 103 through which a bolt 21Z is passed to apply pressure to the panel 10A at the valley 102 to pry off the plate. The cinch nuts can be omitted and the plate removed by a simply pry bar system. In some cases a single cinch nut can be included just in case it is needed to start the removal in cases where the forces have locked the plate down too tight to be removed by the pry bar.

The plates 20 have three rows of shear pegs for cooperation with aligned holes in three adjacent ridges of the panel and thus provide two spaces at the valleys Each male threaded fastener or bolt includes a washer 21W arranged to connect the plate and bolt as a friction fit so that the bolts are carried by the plate when the plate is removed but can be separated from the plate if required.

The shear pegs are permanently attached to the plate by a suitable mounting system which transfers the required forces between them without the peg being torn through the plate. As shown, the pegs 21C are attached to the plate 21A by shoulder members 21M, 21P formed on the peg in front of and behind the plate to clamp the plate therebetween. One suitable method for this mounting is by a method called hot up-setting in which the peg is formed as a pin with the shoulder 21M part way along its length and the end of the pin projecting through the plate. This projecting end is then hot formed to be compressed to define the shoulder 21P compressed against the outside surface of the plate.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A method for assembly and disassembly of a containment wall of a tank comprising:
providing a plurality of panels, each having a top edge, a bottom edge, an inner surface, an outer surface, a first end and a second end such that the panels can be arranged with the first end of one connected to the second end of a second to form a peripheral ring of panels surrounding an area to contain a liquid;
providing on each panel at each end an end section for connection to a next adjacent panel, each end section of the panel containing an array of holes; providing a plurality of connector plates;
each connector plate being shaped and arranged to overlie a part only of the array of holes so that said plurality of the connector plates is arranged on the array of holes with each of the connector plates cooperating with a respective part of the array of holes;
attaching the connector plates to the end section of one panel so as to couple the end section of said one panel to an end section of a next adjacent panel;
each connector plate having a plurality of shear pegs attached to the connector plate so as to extend at right angles thereto, the shear pegs being arranged in an array so that the shear pegs are aligned with respective ones of the holes of the array, the shear pegs having no fastening elements;
assembling the panels by connecting each end section of the panels to an end section of a next adjacent panel by inserting the shear pegs of each connector plate through the respective holes of the array;
assembling the panels by fastening each connector plate to the end section of a panel by at least one threaded fastener, separate from the shear pegs, which threaded fastener comprises a male threaded member which extends through the connector plate and through the panel and is held in place by a cooperating female threaded member to clamp the connector plate against the end section of the panel so that the shear pegs are held in place extending through the respective holes by the threaded fastener, and
disassembling the panels by releasing said male threaded member of said at least one threaded fastener from its cooperating female threaded member to release the connector plate from being clamped against the end section of the panel so that, with said the connector plate being released from being clamped against the end section of the panel, the shear pegs are free to be pulled from the respective holes to release the connector plate from the end section of the panel.

2. The method according to claim 1 wherein the end section of said one panel is overlapped with the end section of the next adjacent panel so that the holes of the array align to form an array of aligned holes.

3. The method according to claim 1 wherein each connector plate includes at least one hole for receiving said at least one threaded fastener inserted therethrough.

4. The method according to claim 1 wherein each threaded fastener is arranged so as to be carried by the connector plate when the plate is removed.

5. The method according to claim 1 wherein the shear pegs are permanently attached to the connector plate.

6. The method according to claim 1 wherein each shear peg comprises a cylindrical pin with a smooth exterior for sliding passage through a respective one of the array of holes.

7. The method according to claim 1 wherein each connector plate includes at least four shear pegs.

8. The method according to claim 1 wherein said at least one threaded fastener is arranged in a row with a plurality of the shear pegs for cooperation with a row of aligned holes of the array.

9. The method according to claim 8 wherein the row of shear pegs and said least one threaded fastener are arranged at equidistant spacing.

10. The method according to claim 1 wherein each connector plate includes at least two rows of the shear pegs with each row being arranged for cooperation with a respective row of aligned holes of the array and with each respective row containing at least one threaded fastener.

11. The method according to claim 1 wherein each connector plate includes at least two rows of the shear with each row being arranged for cooperation with a respective row of aligned holes of the array and with each respective row containing two male threaded fasteners at spaced positions along the row.

12. The method according to claim 1 wherein the panels are corrugated to form ridges and valley between the ridges with the ridges and valleys of the two end sections of the panels aligned.

13. The method according to claim 12 wherein the connector plate lies in contact with at least two of the ridges of an adjacent one of the two end sections of the panels and wherein the aligned holes in the end sections of the panels are located in rows in the ridges.

14. The method according to claim 1 wherein at least some of the connector plates have two rows of shear pegs for cooperation with aligned holes in two adjacent ridges of the end section of the panel leaving a space between the connector plate and the valley located between said two adjacent ridges.

15. The method according to claim 14 wherein the space is used to pry off the connector plate for removal of the connector plate.

16. The method according to claim 14 wherein the connector plate includes at least one nut at the space through which a bolt is passed to apply pressure to the panel at the valley to pry off the connector plate.

17. The method according to claim 12 wherein at least some of the connector plates have three rows of shear pegs for cooperation with aligned holes in three adjacent ridges of the end section of the panel.

18. The method according to claim 1 wherein the male threaded member of the threaded fastener is separate from a hole in the connector plate so as to be passed through the hole with the shear pegs already in place in the array of holes.

19. The method according to claim 1 wherein the shear pegs are tapered at the ends for insertion into the array of holes.

20. The method according to claim 1 wherein the connector plates are mounted on the inner surface of the panels with the shear pegs facing outwardly.

21. The method according to claim 1 wherein the panels are arranged for connection with one peripheral ring of panels mounted on a lower ring of panels to form a stacked wall of panels and wherein the overlapped sections of said one ring are staggered relative to those of the lower ring.

22. The method according to claim 1 wherein the shear pegs are attached to the connector plate by shoulder members formed on the peg in front of and behind the connector plate to clamp the connector plate therebetween.

* * * * *